Patented Nov. 24, 1931

1,833,331

UNITED STATES PATENT OFFICE

JAMES RITCHIE PARK, OF NORTON-ON-TEES, ENGLAND, ASSIGNOR TO IMPERIAL CHEMICAL INDUSTRIES LTD., A CORPORATION OF GREAT BRITAIN

PURIFICATION OF SYNTHETIC ALCOHOLS

No Drawing. Application filed October 13, 1930, Serial No. 488,558, and in Great Britain December 10, 1929.

This invention relates to the purification of alcohols and more especially to the elimination of compounds of iron from alcohols obtained by synthesis from hydrogen and oxides of carbon.

Synthetic alcohols prepared by catalytic hydrogenation of oxides of carbon under pressure are often contaminated with iron compounds, e. g. iron carbonyl, which cannot be completely removed by simple distillation. With a view to the removal of small quantities of various undesired substances causing a peculiar unpleasant odor, it has already been proposed to treat such synthetic alcohols, or a distillation fraction thereof, with an oxidizing agent, if desired with the addition of other purifying substances such as caustic soda solution, sodium bisulphite, or oxalic acid to the distilling liquid during the distillation.

According to the present invention crude synthetic alcohols of the kind described, or a distillation fraction thereof are subjected to a prolonged treatment with alkali for the purpose of eliminating iron compounds. Thus crude synthetic methanol, i. e. the condensate separating on cooling a gas mixture containing oxides of carbon and hydrogen which has been passed under pressure and at a suitable temperature over a methanol-forming catalyst, may be mixed with solid caustic soda and the mixture allowed to stand for several days at the ordinary temperature. If desired, the mixture may be maintained at a raised temperature, employing a reflux condenser if required, the necessary period of treatment being thereby diminished. The mixture, whether at the ordinary or a raised temperature, may be stirred during the treatment, and a slow current of air may be employed for this purpose. It may also be advantageous, especially when the mixture is allowed to stand at the ordinary temperature without subsequent stirring to aerate the mixture at the commencement of the treatment, e. g. by passing a current of air through the mixture, to ensure the presence of dissolved oxygen in the liquid, which is believed to play a part in the purification.

After the prolonged treatment with alkali it will generally be convenient to distil the mixture as such to recover a product substantially free from iron, but this distillation may be preceded by separation of any solid matter from the liquid, e. g. by filtration.

Instead of caustic soda, other alkaline substances, e. g. potash or potassium or sodium carbonate, may be employed, if desired in aqueous solution.

The vessels employed for handling the crude and pure methanol may be made of mild steel as there is no appreciable contamination of the methanol through contact with iron or steel.

*Example.*—One cubic metre of crude synthetic methanol, estimated to contain 130 parts of iron per thousand million, was allowed to flow slowly at the ordinary temperature over 6 kilograms of solid caustic soda supported on a perforated steel tray, whereby most of the caustic soda was dissolved. The solution was collected in a steel tank and a slow stream of air was passed through the liquid while filling, which occupied about 2 hours. The mixture was then allowed to stand at the ordinary temperature, without further supply of air, for 5 days. It was then distilled, the methanol obtained being estimated to contain not more than 2 parts of iron per thousand million.

The method of estimating the very small quantities of iron was to vaporize a known quantity of methanol and to pass the vapors together with air over a roll of silver gauze at a red heat, as in formaldehyde manufacture. The iron was retained in the gauze and the quantity in the methanol used could be estimated by weighing the gauze before and after the passage of the vapors.

The methanol obtained according to the above example was especially suitable for the manufacture of formaldehyde by catalytic oxidation, using a silver gauze catalyst. The use of crude methanol resulted in a relatively rapid deterioration of the catalyst, while the methanol purified according to the example caused no appreciable loss of activity during an extended run.

Various changes may be made in the method described without departing from the invention or sacrificing any of the advantages thereof.

I claim:

1. A process for the removal of iron compounds from crude synthetic alcohols, or distillation fractions thereof, prepared by catalytic hydrogenation of oxides of carbon, which includes the step of subjecting the impure material to a prolonged treatment with alkali.

2. A process for the removal of iron compounds from crude synthetic alcohols, or distillation fractions thereof, prepared by catalytic hydrogenation of oxides of carbon, which comprises subjecting the impure material to a prolonged treatment with alkali and thereafter to distillation.

3. A process as set forth in claim 1 in which the impure alcohol is allowed to stand for several days in the presence of caustic soda.

4. A process as set forth in claim 1 in which the mixture is stirred during the treatment.

5. A process as set forth in claim 1 in which the mixture is stirred by a current of air during the treatment.

6. A process as set forth in claim 1 in which the liquid is aerated at the commencement of the treatment and is then allowed to stand.

In testimony whereof, I affix my signature.

JAMES RITCHIE PARK.